United States Patent
Su et al.

(10) Patent No.: US 11,404,840 B2
(45) Date of Patent: Aug. 2, 2022

(54) DEVICE AND METHOD FOR MEASURING THERMAL LOAD CAUSED BY EXCITED STATE ABSORPTION IN LASER GAIN CRYSTAL

(71) Applicant: Shanxi University, Shanxi Province (CN)

(72) Inventors: Jing Su, Shanxi (CN); Huiqi Yang, Shanxi (CN); Huadong Lu, Shanxi (CN); Kunchi Peng, Shanxi (CN)

(73) Assignee: SHANXI UNIVERSITY, Shanxi Province (CN)

( * ) Notice: Subject to any disclaimer, the term of this patent is extended or adjusted under 35 U.S.C. 154(b) by 120 days.

(21) Appl. No.: 17/061,051

(22) Filed: Oct. 1, 2020

(65) Prior Publication Data
US 2021/0167566 A1 Jun. 3, 2021

(30) Foreign Application Priority Data
Dec. 2, 2019 (CN) .......................... 201911212682.1

(51) Int. Cl.
| | | |
|---|---|---|
| H01S 3/16 | (2006.01) | |
| H01S 3/08 | (2006.01) | |
| H01S 3/00 | (2006.01) | |
| H01S 3/04 | (2006.01) | |

(52) U.S. Cl.
CPC ........ *H01S 3/08031* (2013.01); *H01S 3/0078* (2013.01); *H01S 3/08072* (2013.01); *H01S 3/1611* (2013.01); *H01S 3/1673* (2013.01); *H01S 3/0014* (2013.01); *H01S 3/0092* (2013.01); *H01S 3/0405* (2013.01)

(58) Field of Classification Search
CPC .... H01S 3/0014; H01S 3/0078; H01S 3/0405; H01S 3/08031; H01S 3/08072; H01S 3/1611; H01S 3/1673
See application file for complete search history.

(56) References Cited

FOREIGN PATENT DOCUMENTS
CN 104377540 * 2/2015

* cited by examiner

*Primary Examiner* — Michael Carter
(74) *Attorney, Agent, or Firm* — Hickman Becker Bingham Ledesma LLP

(57) ABSTRACT

A device and a method for measuring thermal load caused by excited state absorption in laser gain crystal are disclosed. Thermal focal lengths on the tangential and sagittal planes of the laser gain crystal are obtained by obtaining the threshold when the pump power is decreased, the optimal operating point, and cavity parameters of the single-frequency laser. Individual ABCD matrices of the laser gain crystal on the tangential plane and the sagittal plane are obtained based on thermal focal length. The thermal load corresponding to the threshold when the pump power is decreased, the ESA thermal load corresponding to the threshold when the pump power is decreased, and the ESA thermal load at the optimal operating point are obtained

20 Claims, 2 Drawing Sheets

DEVICE AND METHOD FOR MEASURING THERMAL LOAD CAUSED BY EXCITED STATE ABSORPTION IN LASER GAIN CRYSTAL

RELATED APPLICATION

This application claims priority under 35 U.S.C. 119(a)-(d) to Foreign Application No. 201911212682.1 filed in China entitled "Device and method for measuring excited state absorption heat load in laser gain crystal" and filed on Dec. 2, 2019, the contents of which are herein incorporated in their entirety by reference for all purposes.

TECHNICAL FIELD

The present application relates to the field of laser, and in particular, to a device and a method for measuring a thermal load caused by excited state absorption in a laser gain crystal.

BACKGROUND

As an important laser source, single-frequency 1342 nm lasers are widely used in fields such as optical fiber sensing, fiber optic communication, and laser medicine. The frequency-doubled 671 nm red lasers are widely used in high-precision laser spectra and ultra-cold atoms, laser medicine, optical parametric oscillators (OPO), and tunable pump sources. With the continuous development of science and technology, for example, in the fields of quantum entanglement and quantum communication, better signal-to-noise ratio and higher-level entanglement can be achieved when 1342/671 nm lasers with better performances and higher power output are used. Therefore, higher output power and better laser performances of 1342/671 nm lasers have always been the focuses of researches. However, the thermal effect of the laser gain crystal is much more serious than that of the 1064 nm laser, which severely limits the power increase of the fundamental frequency laser and the frequency-doubled laser. Thermal load is an important indicator corresponding to the degree of thermal effect of the laser gain crystal. To obtain single-frequency 1342/671 nm laser with higher power output and laser resonant cavity with more optimized design, it is necessary to analyze the thermal load of the laser gain medium before and after the laser output.

The traditional researches on the impact of the excited state absorption (ESA) on the thermal load and laser output power at the laser gain crystal focus on the theoretical research and light probe technology. The theoretical research studies the ESA thermal load based on the rate equation. This method requires complicated theoretical calculation and derivation. The probe light method studies the spectral distribution of the ESA and the thermal lens values by leaving the shaped probe light to transmit through a gain medium with the thermal lens effect and measuring the spectral distribution. However, the spectral distribution measurement results are greatly affected by the detector precision. With this method, the changes of the thermal lens can be directly presented, but an additional beam of laser needs to be introduced, and the measurement accuracy is too low to accurately reflect the severity of the crystal thermal effects.

SUMMARY

In some embodiments, a device and a method for measuring a thermal load caused by ESA in a laser gain crystal are provided, so as to improve the measurement accuracy and accurately reflect the severity of crystal thermal effects.

In some embodiments, a device for measuring a thermal load caused by ESA in a laser gain crystal includes a single-frequency laser (1), a power meter (2), a spectroscope (3), an F-P cavity (4), a photodetector (5), an oscilloscope (6), a signal generator (7), and a high-voltage amplifier (8), where the spectroscope (3), the F-P cavity (4), the photodetector (5), the oscilloscope (6), the signal generator (7), and the high-voltage amplifier (8) are connected in sequence;

output single-frequency laser (1) passes through the spectroscope (3) and is injected into the power meter (2), a part of the laser passing through the spectroscope (3) is injected into the F-P cavity (4) and converted into an electrical signal by the photodetector (5), and the electrical signal output by the photodetector (5) is input to the oscilloscope (6); the oscilloscope (6) is configured to display single-frequency characteristics of the single-frequency laser (1) under different incident pump powers; the oscilloscope (6) is connected to the signal generator (7), and the signal generator (7) is configured to generate a low-frequency scan signal; and the low-frequency scan signal is amplified by the high-voltage amplifier (8) and loaded to a piezoelectric ceramic attached to the F-P cavity (4).

Optionally, the single-frequency laser (1) includes a laser gain crystal.

Optionally, the laser gain crystal is an Nd:YVO$_4$ crystal.

Optionally, an optical resonant cavity of the single-frequency laser (1) is a standing-wave cavity or a traveling-wave cavity.

A method for measuring a thermal load caused by ESA in a laser gain crystal is provided, where the method uses the foregoing device for measuring a thermal load caused by ESA in a laser gain crystal, and includes:

obtaining a threshold when the pump power is decreased and an optimal operating point power of the single-frequency laser;

obtaining cavity parameters of the single-frequency laser;

obtaining thermal focal lengths on the tangential plane and the sagittal plane of the laser gain crystal inside the single-frequency laser according to formulas for the thermal focal lengths on the tangential plane and sagittal plane;

obtaining individual ABCD matrices of the laser gain crystal on the tangential plane and the sagittal plane based on the thermal focal length on the tangential plane, the thermal focal length on the sagittal plane, and the cavity parameters of the single-frequency laser;

substituting the threshold when the pump power is decreased and the cavity parameters of the single-frequency laser into ABCD transfer matrices of the laser gain crystal on the tangential plane, the ABCD transfer matrices of the laser gain crystal on the sagittal plane, and a condition of stability ranges, to obtain a thermal load corresponding to the threshold when the pump power is decreased;

obtaining an ESA thermal load based on the thermal load corresponding to the threshold when the pump power is decreased; and substituting the optimal operating point power and the cavity parameters of the single-frequency laser into the ABCD transfer matrices of the laser gain crystal on the tangential plane, the ABCD transfer matrices of the laser gain crystal on the sagittal plane, and the condition that laser beam size at the laser crystal on the tangential plane is the same as that on the sagittal plane, to obtain an ESA thermal load at the optimal operating point.

Optionally, the obtaining a threshold when the pump power is decreased and an optimal operating point power of the single-frequency laser specifically includes:

increasing and decreasing a pump power of the single-frequency laser, and using the power meter to record laser output power of the single-frequency laser under different injected pump powers;

obtaining single-frequency information; and obtaining the threshold when the pump power is decreased and optimal operating point power of the single-frequency laser based on a laser output power as a function of absorbed pump power and the single-frequency information of the output 1342 nm laser.

Optionally, the obtaining thermal focal lengths on the tangential and sagittal planes of the laser gain crystal inside the single-frequency laser according to formulas for the thermal focal lengths on the tangential and sagittal planes specifically includes:

obtaining the thermal focal length $f_{t(thermal)}$ on the tangential plane of the laser gain crystal according to a formula for the thermal lens of the laser gain crystal on the tangential plane $$f_{t(thermal)} = \frac{\pi K_{\|c} \omega_p^2}{\xi P_p \frac{dn}{dt}[1 - \exp(-\alpha l)]};$$

and obtaining the thermal focal length on the sagittal plane of the laser gain crystal according to a formula for the thermal lens of the laser gain crystal on the sagittal plane $$f_{s(thermal)} = \frac{\pi K_{\perp c} \omega_p^2}{\xi P_p \left(\frac{dn}{dt} + 0.85 \times 10^{-6}\right)[1 - \exp(-\alpha l-)]},$$

where $K_{\|c}$ and $K_{\perp c}$ represent the thermal conductivity coefficients, which are parallel and perpendicular to an optical axis, respectively, $\omega_p$ represents a spot size of the pump laser at the laser crystal, $\xi$ represents a thermal load, $P_P$ represents pump power injected into the laser crystal, $$\frac{dn}{dT}$$

represents a thermo-optic coefficient of the laser crystal, $\alpha$ represents a pump laser absorption coefficient of the laser crystal, l represents an effective length of the doped part of the laser gain crystal, $f_{t(thermal)}$ and $f_{s(thermal)}$ represent thermal focal lengths on the tangential and sagittal planes of the laser gain crystal, respectively.

Optionally, the obtaining individual ABCD matrices of the laser gain crystal on the tangential plane and the sagittal plane based on the thermal focal length on the tangential plane, the thermal focal length on the sagittal plane, and the cavity parameters of the single-frequency laser specifically includes:

obtaining the ABCD transfer matrices $$\begin{pmatrix} A_t & B_t \\ C_t & D_t \end{pmatrix}$$

of the laser gain crystal on the tangential plane based on the thermal focal length on the tangential plane and the cavity parameters of the single-frequency laser by using a formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix};$$

and obtaining the ABCD transfer matrices $$\begin{pmatrix} A_s & B_s \\ C_s & D_s \end{pmatrix}$$

of the laser gain crystal on the sagittal plane based on the thermal focal length on the sagittal plane and the cavity parameters of the single-frequency laser by using a formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\frac{1}{f_{s(thermal)}} & 1 \end{pmatrix},$$

where $$\begin{pmatrix} A_t & B_t \\ C_t & D_t \end{pmatrix}$$

represents the ABCD transfer matrices of the laser gain crystal on the tangential plane, $$\begin{pmatrix} A_s & B_s \\ C_s & D_s \end{pmatrix}$$

represents the ABCD transfer matrices of the laser gain crystal on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrices on the tangential plane; and $$\begin{pmatrix} a_s & b_s \\ c_s & d_s \end{pmatrix}$$

is an expression for the remaining optical transmission matrices on the sagittal plane.

Optionally, the obtaining an ESA thermal load based on the thermal load corresponding to the threshold when the pump power is decreased specifically includes:

when the single-frequency laser is in the stability ranges on both the tangential plane and the sagittal plane, obtaining the ESA thermal load $\xi_{ESA}$ based on the thermal load corresponding to the threshold when the pump power is decreased by using a formula $$\xi_{ESA} = \frac{\lambda_l}{\lambda_p}\left[\xi_{lasing} - \left(1 - \frac{\lambda_P}{\lambda_l}\right)\right],$$

where $\lambda_P$ represents a wavelength of the pump laser, $\lambda_l$ represents a wavelength of an oscillating laser after the laser is emitted, $\xi_{ESA}$ represents the ESA thermal load, and $\xi_{lasing}$ represents the thermal load after the laser is emitted.

Optionally, the substituting the optimal operating point power and the cavity parameters of the single-frequency laser into ABCD transfer matrices of the laser gain crystal on the tangential plane, the ABCD transfer matrices of the laser gain crystal on the sagittal plane, and the condition that laser beam size at the laser crystal on the tangential plane is the same as that on the sagittal plane, to obtain an ESA thermal load at the optimal operating point specifically includes:

when tangential and sagittal plane light spots of the laser resonant cavity at the optimal operating point meet a formula $$\sqrt{\frac{2\lambda_1|B_t|}{\pi\sqrt{4-(A_t+D_t)^2}}} = \sqrt{\frac{2\lambda_1|B_s|}{\pi\sqrt{4-(A_s+D_s)^2}}},$$

obtaining the ESA thermal load at the optimal operating point based on the ABCD transfer matrices of the laser gain crystal on the tangential plane, the ABCD transfer matrices of the laser gain crystal on the sagittal plane, and the optimal operating point power of the single-frequency laser.

The device and method disclosed in this application have the following technical effects.

The device can obtain the ESA thermal load in the laser gain crystal by measuring the bistability-like characteristic of the single-frequency laser and monitoring the transmission spectrum of the output laser. This measurement method features a simple process and accurate results, with no need to analyze the complicated thermal process in the crystal or introduce other optical systems.

BRIEF DESCRIPTION OF DRAWINGS

The following briefly describes the accompanying drawings. The accompanying drawings in the following description show merely some examples, and a person of ordinary skill in the art may still derive other drawings from these accompanying drawings without creative efforts.

DETAILED DESCRIPTION

The following clearly and completely describes some embodiments with reference to accompanying drawings. Apparently, the described examples are merely a part rather than all of the examples. All other examples obtained by a person of ordinary skill in the art based on the examples disclosed in this application without creative efforts shall fall within the protection scope of the present application.

In some embodiments, a device and a method for measuring a thermal load caused by ESA in a laser gain crystal are provided, so as to improve the measurement accuracy and accurately reflect the severity of crystal thermal effects.

The embodiments will be described in further detail below with reference to the accompanying drawings and detailed examples.

Figure 1:
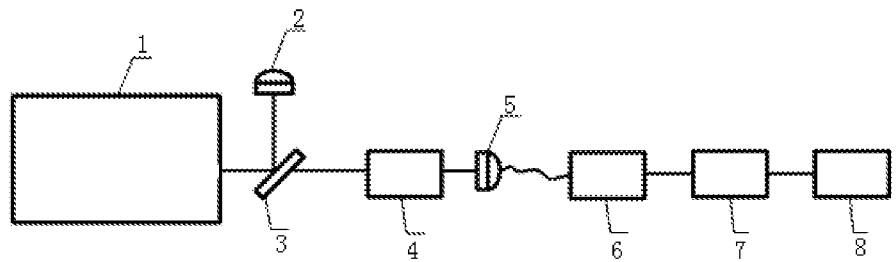
FIG. 1 is a structural diagram of a device for measuring a thermal load caused by ESA in a laser gain crystal according to one embodiment.

FIG. 1 is a structural diagram of a device for measuring a thermal load caused by ESA in a laser gain crystal according to one embodiment. As shown in FIG. 1, a device for measuring a thermal load caused by ESA in a laser gain crystal includes: a single-frequency laser 1, a power meter 2, a spectroscope 3, an F-P cavity 4, a photodetector 5, an oscilloscope 6, a signal generator 7, and a high-voltage amplifier 8, where the spectroscope 3, the F-P cavity 4, the photodetector 5, the oscilloscope 6, the signal generator 7, and the high-voltage amplifier 8 are connected in sequence.

The output laser of the single-frequency laser 1 passes through the spectroscope 3 and is injected into the power meter 2, a part of the laser passing through the spectroscope 3 is injected into the F-P cavity 4 and converted into an electrical signal by the photodetector 5, and the electrical signal output by the photodetector 5 is input to the oscilloscope 6. The oscilloscope 6 is configured to display single-frequency characteristics of the single-frequency laser 1 under different incident pump powers. The oscilloscope 6 is connected to the signal generator 7, and the signal generator 7 is configured to generate a low-frequency scan signal. The low-frequency scan signal is amplified by the high-voltage amplifier 8 and loaded to a piezoelectric ceramic attached to the F-P cavity 4. The single-frequency laser 1 includes a laser gain crystal. The laser gain crystal is an Nd:YVO$_4$ crystal. An optical resonant cavity of the single-frequency laser 1 is a standing-wave cavity or a traveling-wave cavity.

Figure 2:
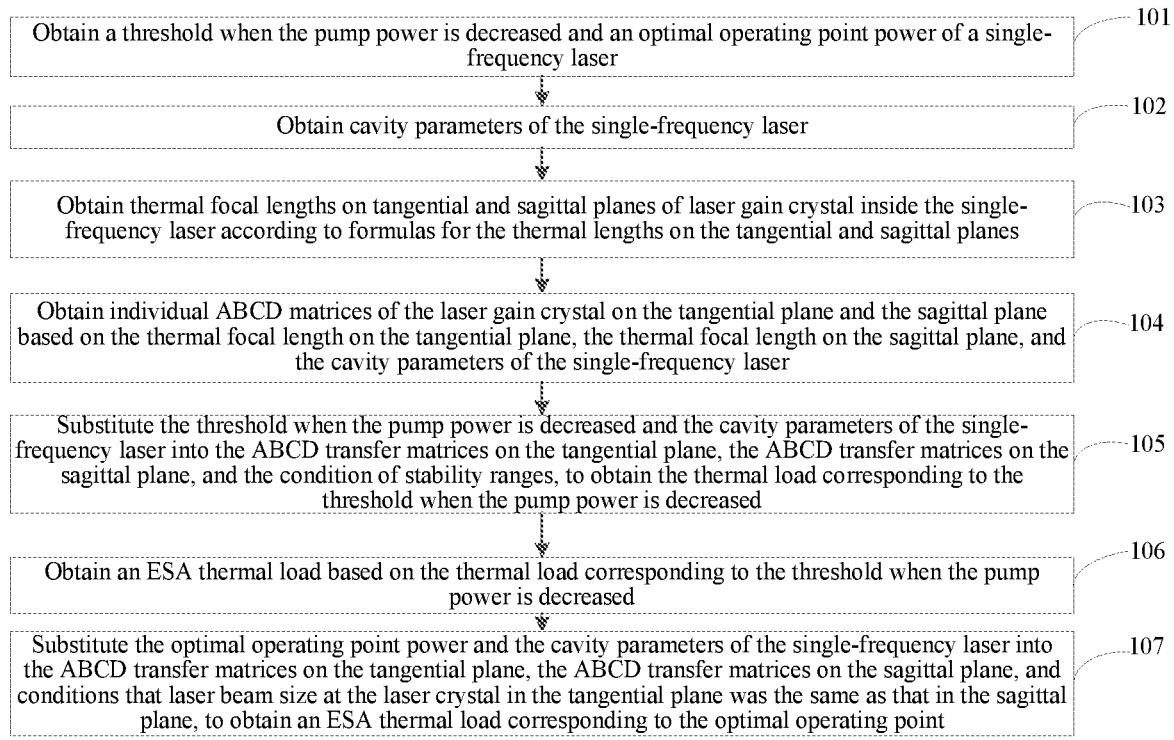
FIG. 2 is a flowchart of a method for measuring a thermal load caused by ESA in a laser gain crystal according to one embodiment.

FIG. 2 is a flowchart of a method for measuring a thermal load caused by ESA in a laser gain crystal according to one embodiment. As shown in FIG. 2, the method for measuring a thermal load caused by ESA in a laser gain crystal uses the device for measuring a thermal load caused by ESA in a laser gain crystal, and includes the following steps:

Step 101: Obtain a threshold when the pump power is decreased and an optimal operating point power of the single-frequency laser. This step specifically includes:

increasing and decreasing a pump power of the single-frequency laser, and using the power meter to record a laser output power of the single-frequency laser under different injected pump powers;

obtaining single-frequency information, where the signal generator generates a low-frequency scan signal, which is then amplified by the high-voltage amplifier and loaded to the piezoelectric ceramic attached to the F-P cavity to scan a length of the F-P cavity, and the oscilloscope records a transmission spectrum of the single-frequency laser, that is, the single-frequency information; and obtaining the threshold when the pump power is decreased and the optimal operating point power of the single-frequency laser based on a laser output power table and the single-frequency information.

Step 102: Obtain cavity parameters of the single-frequency laser.

Step 103: Obtain thermal focal lengths on a tangential plane and sagittal plane of the laser gain crystal inside the single-frequency laser according to formulas for the thermal focal lengths on the tangential and sagittal planes. This step specifically includes:

obtaining the thermal focal length $f_{t(thermal)}$ on the tangential plane of the laser gain crystal according to a formula for the thermal lens of the laser gain crystal on the tangential plane $$f_{t(thermal)} = \frac{\pi K_{\|c} \omega_p^2}{\xi P_P \frac{dn}{dT}[1 - \exp(-\alpha l)]};$$

and obtaining the thermal focal length on the sagittal plane of the laser gain crystal according to a formula for the thermal lens of the laser gain crystal on the sagittal plane $$f_{s(thermal)} = \frac{\pi K_{\perp c} \omega_p^2}{\xi P_P \left(\frac{dn}{dT} + 0.85 \times 10^{-6}\right)[1 - \exp(-\alpha l)]},$$

where $K_{\|c}$ and $K_{\perp c}$ represent the thermal conductivity coefficients, which are parallel and perpendicular to the optical axis, respectively, $\omega_p$ represents a spot size of the pump laser at the laser crystal, $\xi$ represents the thermal load, $P_P$ represents a pump power injected into the laser crystal, $$\frac{dn}{dT}$$

represents a thermo-optic coefficient of the laser crystal, $\alpha$ represents a pump laser absorption coefficient of the laser crystal, l represents an effective length of a doped part of the laser gain crystal, $f_{t(thermal)}$ represents the thermal focal length on the tangential plane of the laser gain crystal, and $f_{s(thermal)}$ represents the thermal focal length on the sagittal plane of the laser gain crystal.

Step 104: Obtain individual ABCD matrices of the laser gain crystal on the tangential plane and the sagittal plane based on the thermal focal length on the tangential plane, the thermal focal length on the sagittal plane, and the cavity parameters of the single-frequency laser. This step specifically includes:

obtaining the ABCD transfer matrices $$\begin{pmatrix} A_t & B_t \\ C_t & D_t \end{pmatrix}$$

of the laser gain crystal on the tangential plane based on the thermal focal length on the tangential plane and the cavity parameters of the single-frequency laser by using a formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix};$$

and obtaining the ABCD transfer matrices $$\begin{pmatrix} A_s & B_s \\ C_s & D_s \end{pmatrix}$$

of the laser gain crystal on the sagittal plane based on the thermal focal length on the sagittal plane and the cavity parameters of the single-frequency laser by using a formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\frac{1}{f_{s(thermal)}} & 1 \end{pmatrix},$$

where $$\begin{pmatrix} A_t & B_t \\ C_t & D_t \end{pmatrix}$$

represents the ABCD transfer matrices of the laser gain crystal on the tangential plane, $$\begin{pmatrix} A_s & B_s \\ C_s & D_s \end{pmatrix}$$

represents the ABCD transfer matrices of the laser gain crystal on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrices on the tangential plane; and $$\begin{pmatrix} a_s & b_s \\ c_s & d_s \end{pmatrix}$$

is an expression for the remaining optical transmission matrices on the sagittal plane.

Step 105: Substitute the threshold when the pump power is decreased and the cavity parameters of the single-frequency laser into the ABCD transfer matrices of the laser gain crystal on the tangential plane, the ABCD transfer matrices of the laser gain crystal on the sagittal plane, and a condition of stability ranges, to obtain a thermal load corresponding to the threshold when the pump power is decreased.

Step 106: Obtain an ESA thermal load based on the thermal load corresponding to the threshold when the pump power is decreased. This step specifically includes:

when the single-frequency laser is in the stability ranges on both the tangential plane and the sagittal plane, i.e., $|A_t+D_t|\leq 2$ & $|A_s+D_s|\leq 2$, the ESA thermal load $\xi_{ESA}$ could be obtained based on the thermal load corresponding to the threshold when the pump power is decreased by using a formula $$\xi_{ESA} = \frac{\lambda_l}{\lambda_p}\left[\xi_{lasing} - \left(1 - \frac{\lambda_P}{\lambda_l}\right)\right],$$

where $\lambda_P$ represents the wavelength of the pump laser, $\lambda_l$ represents the wavelength of the oscillating laser after the laser is emitted, $\xi_{ESA}$ represents the ESA thermal load, and $\xi_{lasing}$ represents the thermal load after the laser is emitted.

Step 107: Substitute the optimal operating point power and the cavity parameters of the single-frequency laser into the ABCD transfer matrices of the laser gain crystal on the tangential plane, the ABCD transfer matrices of the laser gain crystal on the sagittal plane, and the condition that laser beam size at the laser crystal on the tangential plane is the same as that on the sagittal plane, to obtain an ESA thermal load at the optimal operating point. This step specifically includes:

when laser beam size at the laser crystal on the tangential plane is the same as that on the sagittal plane, the above ABCD transfer matrices meet the formula $$\sqrt{\frac{2\lambda_l|B_t|}{\pi\sqrt{4-(A_t+D_t)^2}}} = \sqrt{\frac{2\lambda_l|B_s|}{\pi\sqrt{4-(A_s+D_s)^2}}}$$

in this case, the ESA thermal load at the optimal operating point can be obtained based on the ABCD transfer matrices on the tangential plane, the ABCD transfer matrices on the sagittal plane, and the optimal operating point power of the single-frequency laser.

In some embodiments, a method is provided for measuring a thermal load caused by ESA in a laser gain crystal. The principle is as follows: for Nd:YVO4 lasers operating at 1342 nm, serious thermal effects exist and the thermal effects greatly differ with and without laser output. The obvious changes in the thermal effects will have impact on the stability of the laser resonant cavity. Conversely, the ESA thermal load in the laser gain crystal with or without laser output can be deduced from the laser cavity change reflected by the change in the laser output power.

When the pump wavelength is 880 nm and no laser radiation is produced, as the pump power increases, there is no ESA energy level for particles of the upper energy level, so the ESA effect before laser emitted can be ignored. For laser with bistability-like characteristic, when there is laser radiation, high-power laser radiation suddenly occurs, resulting in a sudden decrease in the number of particles of the upper energy level and the degree of the energy transfer upconversion (ETU) thermal effect. When an output coupling lens has a relatively low transmittance of the fundamental frequency laser, the ETU thermal load can be ignored. For the ESA effect, the absorption cross-section at 1342 nm is only 1/10 of the stimulated absorption cross-section. Therefore, after the laser emission, besides the quantum defects, the ESA thermal load becomes the main source of the laser thermal loads.

The following is the expression for the thermal load after the laser emission:

$$\xi_{lasing} = (1-\xi_{ESA})\left(1-\frac{\lambda_P}{\lambda_l}\right) + \xi_{ESA} \quad (1)$$

The ESA thermal load after the laser emission is derived from the foregoing expression:

$$\xi_{ESA} = \frac{\lambda_l}{\lambda_p}\left[\xi_{lasing} - \left(1 - \frac{\lambda_P}{\lambda_l}\right)\right] \quad (2)$$

$\lambda_P$ represents the wavelength of the pump laser, $\lambda_l$ represents the wavelength of the oscillating laser after the laser is emitted, ESA represents the ESA thermal load, and $\xi_{lasing}$ represents the thermal load after the laser is emitted.

Taking the thermal focal lens at the crystal as the starting point, ABCD transfer matrices on the tangential and sagittal planes are as follows:

$$\begin{pmatrix} A_t & B_t \\ C_t & D_t \end{pmatrix} = \begin{pmatrix} a_t & b_t \\ c_t & d_t \end{pmatrix}\begin{pmatrix} 1 & 0 \\ -\frac{1}{f_{t(thermal)}} & 1 \end{pmatrix} \quad (3)$$

$$\begin{pmatrix} A_s & B_s \\ C_s & D_s \end{pmatrix} = \begin{pmatrix} a_s & b_s \\ c_s & d_s \end{pmatrix}\begin{pmatrix} 1 & 0 \\ -\frac{1}{f_{s(thermal)}} & 1 \end{pmatrix} \quad (4)$$

The formula for the thermal focal lens of the laser gain crystal on the tangential plane is as follows:

$$f_{t(thermal)} = \frac{\pi K_{\|c}\omega_p^2}{\xi P_P \frac{dn}{dT}[1-\exp(-\alpha l)]} \quad (5)$$

The formula for the thermal focal lens of the laser gain crystal on the sagittal plane is as follows:

$$f_{s(thermal)} = \frac{\pi K_{\perp c}\omega_p^2}{\xi P_P\left(\frac{dn}{dT}+0.85\times 10^{-6}\right)[1-\exp(-\alpha l)]} \quad (6)$$

$K_{\|c}$ and $K_{\perp c}$ represent the thermal conductivity coefficients, which are parallel and perpendicular to the optical axis, respectively, $\omega_p$ represents the spot size of the pump laser at the laser crystal, $\xi$ represents the thermal load, $P_P$ represents the pump power injected into the laser crystal, $$\frac{dn}{dT}$$

represents the thermo-optic coefficient of the laser crystal, $\alpha$ represents the pump laser absorption coefficient of the laser crystal, and l represents the effective length of the doped part of the laser gain crystal.

Substitute the measured threshold when the pump power is decreased into the following expression:

$$|A_t+D_t|\le2 \ \& \ |A_s+D_s|\le2 \tag{7}$$

That is, when the single-frequency laser is in the stability ranges on both the tangential plane and the sagittal plane, the thermal load corresponding to the threshold when the pump power is decreased can be obtained, and then $\xi_{ESA}$ can be obtained according to the ESA thermal load expression.

When there is oscillating laser, the pump power corresponding to the optimal operating point of the laser can be obtained based on the output power and the single-frequency state of the laser. In this state, the tangential and sagittal plane light spots corresponding to the laser gain crystal should meet the following formula:

$$\sqrt{\frac{2\lambda_l|B_t|}{\pi\sqrt{4-(A_t+D_t)^2}}} = \sqrt{\frac{2\lambda_l|B_s|}{\pi\sqrt{4-(A_s+D_s)^2}}} \tag{8}$$

The ESA thermal load in the optimal operating point can be obtained based on the ESA thermal load formula (2) and the total thermal load obtained by the foregoing formula. This measurement method provides an effective way to study the thermal characteristics of the laser gain crystal.

The device and method disclosed in this application have the following advantages:

1. The device can obtain the ESA thermal load in the laser gain crystal by measuring the bistability-like characteristic of the single-frequency laser and monitoring the transmission spectrum of the output laser. This measurement method features a simple process and accurate results, with no need to analyze the complicated thermal process in the crystal or introduce other optical systems.

2. The method is applicable to the thermal effect measurement of any gain crystal with bistability-like characteristic.

3. The method is applicable to the ESA thermal load measurement in laser gain crystals in different cavity structures.

4. Based on the ESA thermal load measurement in the laser gain crystal, the device can further analyze the impact of the transmittance of the output coupling lens on the ESA thermal load, providing a solid reference for further increasing the output power of the laser.

In short, the device and method can accurately measure the ESA thermal load in the laser gain crystal with the bistability-like characteristic, as well as the thermal load changes under different transmittances. The device is simple and easy-to-use.

Example 1

Figure 3:
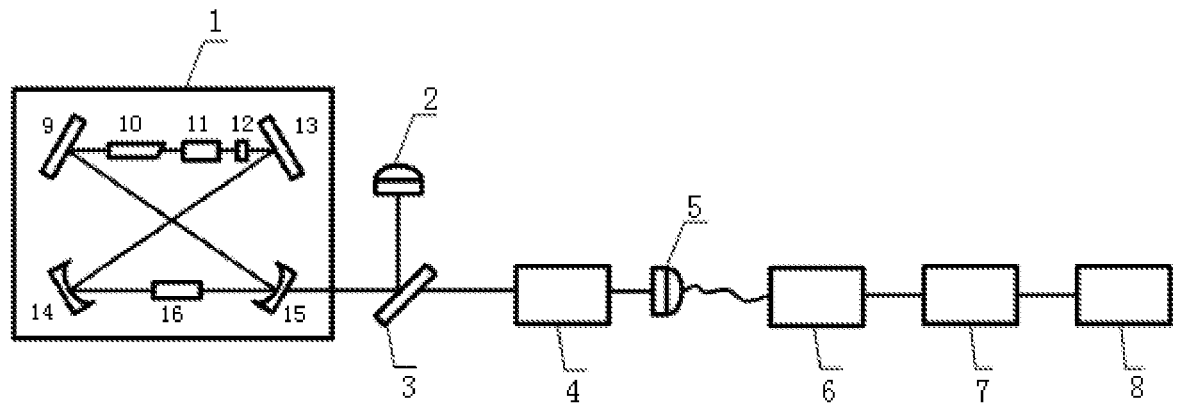
FIG. 3 is a structural diagram of a device for measuring a thermal load caused by ESA in a laser gain crystal in an 8-shaped ring cavity according to one embodiment.

FIG. 3 is a structural diagram of a device for measuring a thermal load caused by ESA in a laser gain crystal in an 8-shaped ring cavity according to one embodiment. The device includes: a single-frequency laser 1, a power meter 2, a spectroscope 3, an F-P cavity 4, a photodetector 5, an oscilloscope 6, a signal generator 7, and a high-voltage amplifier 8. The tested laser gain crystal covered with indium foil is placed in a temperature-controlled red copper oven through vacuum indium welding, and then placed in a laser resonant cavity. The temperature-controlled oven uses a thermoelectric cooler (TEC) for temperature control, with a temperature control accuracy of 0.1° C. The single-frequency laser 1 is of an 8-shaped structure, and includes a first concave-convex lens 9, an Nd:YVO$_4$ laser crystal 10, a TGG magneto-optical crystal 11 surrounded by permanent magnet, a half-wave plate 12, a first plano-convex lens 13, a first plano-concave lens 14, a second plano-concave lens 15, and a frequency-doubling crystal 16. The frequency-doubling crystal is inserted to obtain a more stable single-frequency laser output. The first concave-convex lens 9 is coated with a film that is high transmission to the pump laser and high reflection to the oscillating laser, the first plano-convex lens 13 is coated with a film that is high reflection to the fundamental frequency laser, the first plano-concave lens 14 is coated with a film that is high reflection to both the fundamental frequency laser and the frequency-doubled laser, and the second plano-concave lens 15 is coated with a film that is partial transmission to the fundamental laser and high transmission high transmission to the frequency-doubled laser. The fundamental frequency laser generated by the single-frequency laser 1 passes through the spectroscope 3, and most of the oscillating laser is injected into the power meter 2, and the transmitted weak oscillating laser is injected into the photodetector 5. An output signal of the photodetector 5 is input to the oscilloscope 6 to display the transmission spectrum of the single-frequency laser 1. A low-frequency scan signal output by the signal generator 7 is amplified by the high-voltage amplifier 8 and loaded to a piezoelectric ceramic attached to the F-P cavity.

Example 2

Figure 4:
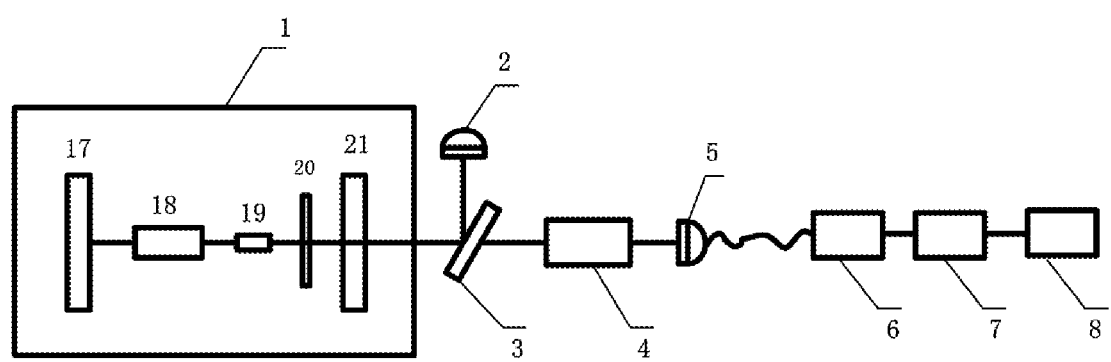
FIG. 4 is a structural diagram of a device for measuring a thermal load caused by ESA in a laser gain crystal in a standing-wave cavity according to one embodiment.

FIG. 4 is a structural diagram of a device for measuring a thermal load caused by ESA in a laser gain crystal in a standing-wave cavity according to one embodiment. The device includes: a single-frequency laser 1, a power meter 2, a spectroscope 3, an F-P cavity 4, a photodetector 5, an oscilloscope 6, a signal generator 7, and a high-voltage amplifier 8. The tested laser gain crystal covered with indium foil is placed in a temperature-controlled red copper oven through vacuum indium welding, and then placed in a laser resonant cavity. The temperature-controlled oven uses a TEC for temperature control, with a temperature control accuracy of 0.1° C. The single-frequency laser 1 uses a standing-wave cavity structure, and includes a concave-convex lens 17, a laser crystal 18, a frequency-doubling crystal 19, an etalon 20, and a plano-concave lens 21. The concave-convex lens 17 and the plano-concave lens 21 are two optical lenses constituting the standing-wave cavity. The concave-convex lens 17 is coated with a film that is high transmission to the pump laser and high reflection to the fundamental frequency laser and frequency-doubled laser, and the plano-concave lens 21 is coated with a film that is partial transmission to the fundamental frequency laser and high transmission to the frequency-doubled laser. The fundamental frequency laser generated by the single-frequency laser 1 passes through the spectroscope 3, and the 1342 nm laser is injected into the power meter 2, and the transmitted weak fundamental frequency laser is injected into the photodetector 5. An output signal of the photodetector 5 is input to the oscilloscope 6 to display a transmission spectrum of the single-frequency laser 1. A low-frequency scan signal output by the signal generator 7 is amplified by the high-voltage amplifier 8 and loaded to a piezoelectric ceramic attached to the F-P cavity.

Example 3

A tested Nd:YVO$_4$ laser gain crystal is a composite crystal with a size of 3*3*(5+15) mm$^3$, of which 5 mm is an undoped part and 15 mm is a part with 0.3% doping concentration. Both ends of the crystal are plated with 880/1064/1342 nm anti-reflection films, with a 1.5-degree wedge angle at the second end face. The single-frequency laser 1 is an 8-shaped ring structure. The first concave-convex lens 9 is coated with a film that is high transmission to the pump laser and high reflection to the oscillating laser, with a radius of curvature of 1500 mm. The first plano-convex lens 13 is coated with a film that is high reflection to the fundamental frequency laser, with a radius of curvature of 1500 mm. The first plano-concave lens 14 is coated with a film that is high reflection to both the fundamental frequency laser and the frequency-doubled laser, with a radius of curvature of −100 mm. The second plano-concave lens 15 is coated with a film that is partial transmission to the fundamental frequency laser, with a reflectivity of 0.5% and a radius of curvature of −100 mm. The photodetector 5 is configured to detect the transmittance of the 1342 nm laser. The oscilloscope 6 is configured to monitor the single frequency of the laser.

When an injected pump power is increased to 45.3 W, there is a laser output. Due to the existence of the bistability-like characteristic, when the pump power is reduced to 40.2 W, there is no laser output. A thermal load corresponding to the threshold when the pump power is decreased is 43.63% according to the following formula:

$$|A_t + D_t| \leq 2 \,\&\, |A_s + D_s| \leq 2$$

The ESA thermal load corresponding to the threshold when the pump power is decreased is 14.03% according to the following formula:

$$\xi_{ESA} = \frac{\lambda_l}{\lambda_p}\left[\xi_{lasing} - \left(1 - \frac{\lambda_P}{\lambda_l}\right)\right]$$

The optimal pump power is 42.6 W. The thermal load at an optimal operating point is 46.23% according to the following formula:

$$\sqrt{\frac{2\lambda_l |B_t|}{\pi\sqrt{4 - (A_t + D_t)^2}}} = \sqrt{\frac{2\lambda_l |B_s|}{\pi\sqrt{4 - (A_s + D_s)^2}}}$$

The ESA thermal load at the optimal operating point is 18% according to the following formula:

$$\xi_{ESA} = \frac{\lambda_l}{\lambda_p}\left[\xi_{lasing} - \left(1 - \frac{\lambda_P}{\lambda_l}\right)\right]$$

In the above calculation, the thermal conductivity $K_{\parallel c}$ parallel to the optical axis is 5.23 W/m/K, the thermal conductivity $K_{\perp c}$ perpendicular to the optical axis is 5.1 W/m/K, the spot size $\omega_p$ of the pump laser at the laser crystal is 510 μm, the thermo-optic coefficient $$\frac{dn}{dT}$$

is 3*10$^{-6}$/K, the absorption coefficient α of the laser crystal to the pump laser is 1.5/cm, and the effective length l of the doped part of the laser gain crystal is 15 mm. The same method can be used to measure the ESA thermal load in the laser gain crystal under different output coupler.

Each example of the present specification is described in a progressive manner, each example focuses on the difference from other examples, and the same and similar parts between the examples may refer to each other.

Several examples are used herein for illustration of the principles and implementations of the different embodiments. The description of the foregoing examples is used to help illustrate the method disclosed in this application and the core principles thereof. In addition, those of ordinary skill in the art can make various modifications in terms of specific implementations in accordance with the techniques disclosed in this application.

What is claimed is:

1. A device for measuring a thermal load caused by excited state absorption (ESA) in a laser gain crystal, comprising:
    a single-frequency laser (1), a power meter (2), a spectroscope (3), an F-P cavity (4), a photodetector (5), an oscilloscope (6), a signal generator (7), and a high-voltage amplifier (8),
    wherein the spectroscope (3), the F-P cavity (4), the photodetector (5), the oscilloscope (6), the signal generator (7), and the high-voltage amplifier (8) are connected in sequence,
    wherein an output laser of the single-frequency laser (1) passes through the spectroscope (3) and is injected into the power meter (2), a part of the laser passing through the spectroscope (3) is injected into the F-P cavity (4) and converted into an electrical signal by the photodetector (5), and the electrical signal output by the photodetector (5) is input to the oscilloscope (6),
    wherein the oscilloscope (6) is configured to display single-frequency characteristics of the single-frequency laser (1) under different incident pump powers,
    wherein the oscilloscope (6) is connected to the signal generator (7), and the signal generator (7) is configured to generate a low-frequency scan signal, and
    wherein the low-frequency scan signal is amplified by the high-voltage amplifier (8) and loaded to a piezoelectric ceramic attached to the F-P cavity (4).

2. The device for measuring a thermal load caused by ESA in a laser gain crystal according to claim 1, wherein the single-frequency laser (1) comprises a laser gain crystal.

3. The device for measuring a thermal load caused by ESA in a laser gain crystal according to claim 2, wherein the laser gain crystal is an Nd:YVO$_4$ crystal.

4. The device for measuring a thermal load caused by ESA in a laser gain crystal according to claim 1, wherein an optical resonant cavity of the single-frequency laser (1) is a standing-wave cavity or a traveling-wave cavity.

5. A method for measuring a thermal load caused by ESA in a laser gain crystal, wherein the method is performed with the following device, which comprises:
- a single-frequency laser (1), a power meter (2), a spectroscope (3), an F-P cavity (4), a photodetector (5), an oscilloscope (6), a signal generator (7), and a high-voltage amplifier (8),
- wherein the spectroscope (3), the F-P cavity (4), the photodetector (5), the oscilloscope (6), the signal generator (7), and the high-voltage amplifier (8) are connected in sequence,
- wherein an output laser of the single-frequency laser (1) passes through the spectroscope (3) and is injected into the power meter (2), a part of the laser passing through the spectroscope (3) is injected into the F-P cavity (4) and converted into an electrical signal by the photodetector (5), and the electrical signal output by the photodetector (5) is input to the oscilloscope (6),
- wherein the oscilloscope (6) is configured to display single-frequency characteristics of the single-frequency laser (1) under different incident pump powers,
- wherein the oscilloscope (6) is connected to the signal generator (7), and the signal generator (7) is configured to generate a low-frequency scan signal, and
- wherein the low-frequency scan signal is amplified by the high-voltage amplifier (8) and loaded to a piezoelectric ceramic attached to the F-P cavity (4), and the method comprises:
- obtaining a threshold when a pump power is decreased and optimal operating point power of the single-frequency laser;
- obtaining cavity parameters of the single-frequency laser;
- obtaining thermal focal lengths on tangential and sagittal planes of the laser gain crystal inside the single-frequency laser according to formulas for the thermal focal lengths on the tangential and sagittal planes;
- obtaining individual ABCD matrices of the laser gain crystal on the tangential plane and the sagittal plane based on the thermal focal length on the tangential plane, the thermal focal length on the sagittal plane, and the cavity parameters of the single-frequency laser;
- substituting the threshold when the pump power is decreased and the cavity parameters of the single-frequency laser into ABCD transfer matrices on the tangential plane, the ABCD transfer matrices on the sagittal plane, and a condition of stability ranges, to obtain the thermal load corresponding to the threshold when the pump power is decreased;
- obtaining the ESA thermal load based on the thermal load corresponding to the threshold when the pump power is decreased; and
- substituting the optimal operating point power and the cavity parameters of the single-frequency laser into the ABCD transfer matrices on the tangential plane, the ABCD transfer matrices on the sagittal plane, and the condition that laser beam size at the laser gain crystal on the tangential plane is the same as that on the sagittal plane, to obtain an ESA thermal load at the optimal operating point.

6. The method for measuring a thermal load caused by ESA in a laser gain crystal according to claim 5, wherein the single-frequency laser (1) comprises a laser gain crystal.

7. The method for measuring a thermal load caused by ESA in a laser gain crystal according to claim 6, wherein the laser gain crystal is an Nd:YVO$_4$ crystal.

8. The method for measuring a thermal load caused by ESA in a laser gain crystal according to claim 7, wherein the obtaining a threshold when the pump power is decreased and the optimal operating point power of the single-frequency laser specifically comprises:
- increasing and decreasing the pump power of the single-frequency laser, and using the power meter to record a laser output power of the single-frequency laser under different injected pump powers;
- obtaining single-frequency information; and
- obtaining the threshold when the pump power is decreased and the optimal operating point power of the single-frequency laser based on a laser output power table and the single-frequency information.

9. The method for measuring a thermal load caused by ESA in a laser gain crystal according to claim 7, wherein the obtaining thermal focal lengths on the tangential plane and the sagittal plane of the laser gain crystal inside the single-frequency laser according to formulas for the thermal focal lengths on the tangential and sagittal planes specifically comprises:
- obtaining the thermal focal length $f_{t(thermal)}$ on the tangential plane of the laser gain crystal according to the formula for a thermal lens of the laser gain crystal on the tangential plane $$f_{t(thermal)} = \frac{\pi K_{\|c}\omega_p^2}{\xi P_P \frac{dn}{dT}[1-\exp(-\alpha l)]};$$

and

- obtaining the thermal focal length on the sagittal plane of the laser gain crystal according to the formula for the thermal lens of the laser gain crystal on the sagittal plane $$f_{s(thermal)} = \frac{\pi K_{\perp c}\omega_p^2}{\xi P_P\left(\frac{dn}{dT}+0.85\times 10^{-6}\right)[1-\exp(-\alpha l)]},$$

wherein $K_{\|c}$ and $K_{\perp c}$ represent the thermal conductivity coefficients, which are parallel and perpendicular to the optical axis, respectively, $\omega_p$ represents a spot size of a pump laser at the laser gain crystal, $\xi$ represents the thermal load, $P_P$ represents a pump power injected into the laser gain crystal, $$\frac{dn}{dT}$$

represents the thermo-optic coefficient of the laser gain crystal, $\alpha$ represents the pump laser absorption coefficient of the laser gain crystal, l represents an effective length of a doped part of the laser gain crystal, $f_{t(thermal)}$ represents the thermal focal length on the tangential plane of the laser gain crystal, and $f_{s(thermal)}$ represents the thermal focal length on the sagittal plane of the laser gain crystal.

10. The method for measuring a thermal load caused by ESA in a laser gain crystal according to claim 6, wherein the obtaining a threshold when the pump power is decreased and the optimal operating point power of the single-frequency laser specifically comprises:

increasing and decreasing the pump power of the single-frequency laser, and using the power meter to record a laser output power of the single-frequency laser under different injected pump powers;

obtaining single-frequency information; and obtaining the threshold when the pump power is decreased and the optimal operating point power of the single-frequency laser based on a laser output power table and the single-frequency information.

11. The method for measuring a thermal load caused by ESA in a laser gain crystal according to claim 6, wherein the obtaining thermal focal lengths on tangential and sagittal planes of the laser gain crystal inside the single-frequency laser according to formulas for the thermal focal lengths on the tangential and sagittal planes specifically comprises:

obtaining the thermal focal length $f_{t(thermal)}$ on the tangential plane of the laser gain crystal according to the formula for the thermal lens of the laser gain crystal on the tangential plane $$f_{t(thermal)} = \frac{\pi K_{\|c}\omega_p^2}{\xi P_P \frac{dn}{dT}[1-\exp(-\alpha l)]};$$

and obtaining the thermal focal length on the sagittal plane of the laser gain crystal according to the formula for a thermal lens of the laser gain crystal on the sagittal plane $$f_{s(thermal)} = \frac{\pi K_{\perp c}\omega_p^2}{\xi P_P \left(\frac{dn}{dT}+0.85\times 10^{-6}\right)[1-\exp(-\alpha l)]},$$

wherein $K_{\|c}$ and $K_{\perp c}$ represent the thermal conductivity coefficients, which are parallel and perpendicular to the optical axis, respectively, $\omega_p$ represents a spot size of the pump laser at the laser gain crystal, $\xi$ represents the thermal load, $P_P$ represents the pump power injected into the gain laser crystal, $$\frac{dn}{dT}$$

represents the thermo-optic coefficient of the laser gain crystal, $\alpha$ represents the pump laser absorption coefficient of the laser gain crystal, l represents the effective length of a doped part of the laser gain crystal, $f_{t(thermal)}$ represents the thermal focal length on the tangential plane of the laser gain crystal, and $f_{s(thermal)}$ represents the thermal focal length on the sagittal plane of the laser gain crystal.

12. The method for measuring a thermal load caused by ESA in a laser gain crystal according to claim 11, wherein the obtaining individual ABCD matrices of the laser gain crystal on the tangential plane and the sagittal plane based on the thermal focal length on the tangential plane, the thermal focal length on the sagittal plane, and the cavity parameters of the single-frequency laser specifically comprises:

obtaining the ABCD transfer matrices $$\begin{pmatrix} A_t & B_t \\ C_t & D_t \end{pmatrix}$$

of the laser gain crystal on the tangential plane based on the thermal focal length on the tangential plane and the cavity parameters of the single-frequency laser by using the formula $$\begin{pmatrix} A_t & B_t \\ C_t & D_t \end{pmatrix} = \begin{pmatrix} a_t & b_t \\ c_t & d_t \end{pmatrix}\begin{pmatrix} 1 & 0 \\ -\frac{1}{f_{t(thermal)}} & 1 \end{pmatrix};$$

and obtaining the ABCD transfer matrices $$\begin{pmatrix} A_s & B_s \\ C_s & D_s \end{pmatrix}$$

of the laser gain crystal on the sagittal plane based on the thermal focal length on the sagittal plane and the cavity parameters of the single-frequency laser by using the formula $$\begin{pmatrix} A_s & B_s \\ C_s & D_s \end{pmatrix} = \begin{pmatrix} a_s & b_s \\ c_s & d_s \end{pmatrix}\begin{pmatrix} 1 & 0 \\ -\frac{1}{f_{s(thermal)}} & 1 \end{pmatrix},$$

wherein $$\begin{pmatrix} A_t & B_t \\ C_t & D_t \end{pmatrix}$$

represents the ABCD transfer matrices of the laser gain crystal on the tangential plane, $$\begin{pmatrix} A_s & B_s \\ C_s & D_s \end{pmatrix}$$

represents the ABCD transfer matrices of the laser gain crystal on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrices on the tangential plane; and $$\begin{pmatrix} a_s & b_s \\ c_s & d_s \end{pmatrix}$$

is an expression for the remaining optical transmission matrices on the sagittal plane.

13. The method for measuring a thermal load caused by ESA in a laser gain crystal according to claim 5, wherein an optical resonant cavity of the single-frequency laser (1) is a standing-wave cavity or a traveling-wave cavity.

14. The method for measuring a thermal load caused by ESA in a laser gain crystal according to claim 13, wherein the obtaining a threshold when the pump power is decreased and the optimal operating point power of the single-frequency laser specifically comprises:
  increasing and decreasing the pump power of the single-frequency laser, and using the power meter to record a laser output power of the single-frequency laser under different injected pump powers;
  obtaining single-frequency information; and
  obtaining the threshold when the pump power is decreased and the optimal operating point power of the single-frequency laser based on a laser output power table and the single-frequency information.

15. The method for measuring a thermal load caused by ESA in a laser gain crystal according to claim 13, wherein the obtaining thermal focal lengths on the tangential plane and the sagittal plane of the laser gain crystal inside the single-frequency laser according to formulas for the thermal focal lengths on the tangential and sagittal planes specifically comprises:
  obtaining the thermal focal length $f_{t(thermal)}$ on the tangential plane of the laser gain crystal according to the formula for a thermal lens of the laser gain crystal on the tangential plane $$f_{t(thermal)} = \frac{\pi K_{\|c} \omega_p^2}{\xi P_P \frac{dn}{dT}[1 - \exp(-\alpha l)]};$$

and
  obtaining the thermal focal length on the sagittal plane of the laser gain crystal according to the formula for the thermal lens of the laser gain crystal on the sagittal plane $$f_{s(thermal)} = \frac{\pi K_{\perp c} \omega_p^2}{\xi P_P \left(\frac{dn}{dT} + 0.85 \times 10^{-6}\right)[1 - \exp(-\alpha l)]},$$

wherein
  $K_{\|c}$ and $K_{\perp c}$ represent the thermal conductivity coefficients, which are parallel and perpendicular to the optical axis, respectively, $\omega_p$ represents a spot size of a pump laser at the laser gain crystal, $\xi$ represents the thermal load, $P_P$ represents the pump power injected into the laser gain crystal, $$\frac{dn}{dT}$$

represents the thermo-optic coefficient of the laser gain crystal, $\alpha$ represents the pump laser absorption coefficient of the laser crystal, l represents the effective length of a doped part of the laser gain crystal, $f_{t(thermal)}$ represents the thermal focal length on the tangential plane of the laser gain crystal, and $f_{s(thermal)}$ represents the thermal focal length on the sagittal plane of the laser gain crystal.

16. The method for measuring a thermal load caused by ESA in a laser gain crystal according to claim 5, wherein the obtaining a threshold when the pump power is decreased and optimal operating point power of the single-frequency laser specifically comprises:
  increasing and decreasing the pump power of the single-frequency laser, and using the power meter to record laser output power of the single-frequency laser under different injected pump powers;
  obtaining single-frequency information; and
  obtaining the threshold when the pump power is decreased and the optimal operating point power of the single-frequency laser based on a laser output power table and the single-frequency information.

17. The method for measuring a thermal load caused by ESA in a laser gain crystal according to claim 5, wherein the obtaining thermal focal lengths on the tangential plane and the sagittal plane of the laser gain crystal inside the single-frequency laser according to formulas for the thermal focal lengths on the tangential and sagittal planes specifically comprises:
  obtaining the thermal focal length $f_{t(thermal)}$ on the tangential plane of the laser gain crystal according to the formula for a thermal lens of the laser gain crystal on the tangential plane $$f_{t(thermal)} = \frac{\pi K_{\|c} \omega_p^2}{\xi P_P \frac{dn}{dT}[1 - \exp(-\alpha l)]};$$

and
  obtaining the thermal focal length on the sagittal plane of the laser gain crystal according to the formula for the thermal lens of the laser gain crystal on the sagittal plane $$f_{s(thermal)} = \frac{\pi K_{\perp c} \omega_p^2}{\xi P_P \left(\frac{dn}{dT} + 0.85 \times 10^{-6}\right)[1 - \exp(-\alpha l)]},$$

wherein
  $K_{\|c}$ and $K_{\perp c}$ represent thermal conductivity coefficients, which are parallel and perpendicular to an optical axis, respectively, $\omega_p$ represents a spot size of the pump laser at the laser gain crystal, $\xi$ represents a thermal load, $P_P$ represents pump power injected into the laser gain crystal, $$\frac{dn}{dT}$$

represents a thermo-optic coefficient of the laser gain crystal, α represents a pump laser absorption coefficient of the laser gain crystal, l represents an effective length of a doped part of the laser gain crystal, $f_{t(thermal)}$ represents a thermal focal length on the tangential plane of the laser gain crystal, and $f_{s(thermal)}$ represents a thermal focal length on the sagittal plane of the laser gain crystal.

18. The method for measuring a thermal load caused by ESA in a laser gain crystal according to claim 17, wherein the obtaining individual ABCD matrices of the laser gain crystal on the tangential plane and the sagittal plane based on the thermal focal length on the tangential plane, the thermal focal length on the sagittal plane, and the cavity parameters of the single-frequency laser specifically comprises:
   obtaining the ABCD transfer matrices $$\begin{pmatrix} A_t & B_t \\ C_t & D_t \end{pmatrix}$$

of the laser gain crystal on the tangential plane based on the thermal focal length on the tangential plane and the cavity parameters of the single-frequency laser by using the formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\dfrac{1}{f_{t(thermal)}} & 1 \end{pmatrix};$$

and
   obtaining the ABCD transfer matrices $$\begin{pmatrix} A_s & B_s \\ C_s & D_s \end{pmatrix}$$

of the laser gain crystal on the sagittal plane based on the thermal focal length on the sagittal plane and the cavity parameters of the single-frequency laser by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\dfrac{1}{f_{s(thermal)}} & 1 \end{pmatrix},$$

wherein $$\begin{pmatrix} A_t & B_t \\ C_t & D_t \end{pmatrix}$$

represents the ABCD transfer matrices of the laser gain crystal on the tangential plane, $$\begin{pmatrix} A_s & B_s \\ C_s & D_s \end{pmatrix}$$

represents the ABCD transfer matrices of the laser gain crystal on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrices on the tangential plane; and $$\begin{pmatrix} a_s & b_s \\ c_s & d_s \end{pmatrix}$$

is an expression for the remaining optical transmission matrices on the sagittal plane.

19. The method for measuring a thermal load caused by ESA in a laser gain crystal according to claim 18, wherein the obtaining an ESA thermal load based on the thermal load corresponding to the threshold when the pump power is decreased specifically comprises:
   when the single-frequency laser is in the stability ranges on both the tangential plane and the sagittal plane, obtaining the ESA thermal load $\xi_{ESA}$ based on the thermal load corresponding to the threshold when the pump power is decreased by using the formula $$\xi_{ESA} = \dfrac{\lambda_l}{\lambda_p}\left[\xi_{lasing} - \left(1 - \dfrac{\lambda_P}{\lambda_l}\right)\right],$$

wherein
   $\lambda_P$ represents a wavelength of the pump laser, $\lambda_l$ represents a wavelength of an oscillating laser after the laser is emitted, $\xi_{ESA}$ represents the ESA thermal load, and $\xi_{lasing}$ represents the thermal load after the laser is emitted.

20. The method for measuring a thermal load caused by ESA in a laser gain crystal according to claim 18, wherein the substituting the optimal operating point and the cavity parameters of the single-frequency laser into the ABCD transfer matrices on the tangential plane, the ABCD transfer matrices on the sagittal plane, and the condition that laser beam size at the laser gain crystal on the tangential plane is the same as that on the sagittal plane, to obtain the ESA thermal load at the optimal operating point specifically comprises:
   when laser beam size at the laser gain crystal on the tangential plane is the same as that on the sagittal plane $$\sqrt{\dfrac{2\lambda_1|B_t|}{\pi\sqrt{4-(A_t+D_t)^2}}} = \sqrt{\dfrac{2\lambda_1|B_s|}{\pi\sqrt{4-(A_s+D_s)^2}}},$$

obtaining the ESA thermal load at the optimal operating point based on the ABCD transfer matrices on the tangential plane, the ABCD transfer matrices on the sagittal plane, and the optimal operating point power of the single-frequency laser.

* * * * *